(12) United States Patent (10) Patent No.: US 9,286,251 B2
Tzannes et al. (45) Date of Patent: Mar. 15, 2016

(54) RESOURCE SHARING IN A TELECOMMUNICATIONS ENVIRONMENT

(71) Applicant: TQ DELTA, LLC, Austin, TX (US)

(72) Inventors: Marcos C. Tzannes, Alamo, CA (US); Michael Lund, West Newton, MA (US)

(73) Assignee: TQ DELTA, LLC, Austin, TX (US)

( * ) Notice: Subject to any disclaimer, the term of this patent is extended or adjusted under 35 U.S.C. 154(b) by 0 days.

(21) Appl. No.: 14/730,874

(22) Filed: Jun. 4, 2015

(65) Prior Publication Data

US 2015/0268863 A1 Sep. 24, 2015

Related U.S. Application Data

(63) Continuation of application No. 14/081,469, filed on Nov. 15, 2013, now Pat. No. 9,069,718, which is a continuation of application No. 13/942,938, filed on Jul. 16, 2013, now Pat. No. 8,607,126, which is a (Continued)

(51) Int. Cl.
*H03M 13/00* (2006.01)
*H04B 1/38* (2015.01)
(Continued)

(52) U.S. Cl.
CPC .......... *G06F 13/1647* (2013.01); *G06F 3/0604* (2013.01); *G06F 3/0665* (2013.01);
(Continued)

(58) Field of Classification Search
CPC ..... G06F 13/1647; H04B 1/38; H04L 1/0041; H04L 1/0057; H04L 1/0071; H04L 27/2601; H04L 49/90; H04L 49/901; H04L 12/5601; H04L 1/1809; H04L 1/1835; H04L 1/1874; H04L 2012/5647; H04L 45/00; H04L 45/72; H04L 47/10; H04L 47/2433; H04L 47/2441; H04L 47/32; H04L 69/324
USPC .......... 714/748, 776, 774, 784; 711/147, 157; 375/222; 709/215
See application file for complete search history.

(56) References Cited

U.S. PATENT DOCUMENTS

| 4,979,174 A | 12/1990 | Cheng et al. |
| 5,063,533 A | 11/1991 | Erhart et al. |

(Continued)

FOREIGN PATENT DOCUMENTS

| EP | 1006689 | 6/2000 |
| EP | 1041756 | 10/2000 |

(Continued)

OTHER PUBLICATIONS

Shoji, T. et al: "Wireless Access Method to Ensure Each Users QOS in Unpredictable and Various QOS Requirements Wireless Personal Communications," Springer, Dordrecht, NL, vol. 22, No, 2, Aug. 2002, pp. 139-151.

(Continued)

*Primary Examiner* — John J Tabone, Jr.
(74) *Attorney, Agent, or Firm* — Jason H. Vick; Sheridan Ross, PC

(57) ABSTRACT

A transceiver is designed to share memory and processing power amongst a plurality of transmitter and/or receiver latency paths, in a communications transceiver that carries or supports multiple applications. For example, the transmitter and/or receiver latency paths of the transceiver can share an interleaver/deinterleaver memory. This allocation can be done based on the data rate, latency, BER, impulse noise protection requirements of the application, data or information being transported over each latency path, or in general any parameter associated with the communications system.

29 Claims, 3 Drawing Sheets

Related U.S. Application Data continuation of application No. 13/567,261, filed on Aug. 6, 2012, now Pat. No. 8,495,473, which is a continuation of application No. 12/901,699, filed on Oct. 11, 2010, now Pat. No. 8,276,048, which is a continuation of application No. 12/761,586, filed on Apr. 16, 2010, now Pat. No. 7,844,882, which is a continuation of application No. 11/246,163, filed on Oct. 11, 2005, now Pat. No. 7,831,890.

(60) Provisional application No. 60/618,269, filed on Oct. 12, 2004.

(51) Int. Cl.
*G06F 13/00* (2006.01)
*G06F 15/16* (2006.01)
*G06F 13/16* (2006.01)
*H04L 1/18* (2006.01)
*H04L 12/54* (2013.01)
*H04L 12/701* (2013.01)
*H04L 12/721* (2013.01)
*H04L 12/801* (2013.01)
*H04L 1/00* (2006.01)
*H04L 27/26* (2006.01)
*H04L 12/861* (2013.01)
*H04L 12/879* (2013.01)
*G06F 3/06* (2006.01)

(52) U.S. Cl.
CPC ............. *G06F3/0673* (2013.01); *H04B 1/38* (2013.01); *H04L 1/0041* (2013.01); *H04L 1/0071* (2013.01); *H04L 1/1809* (2013.01); *H04L 1/1835* (2013.01); *H04L 1/1874* (2013.01); *H04L 12/5601* (2013.01); *H04L 27/2601* (2013.01); *H04L 45/00* (2013.01); *H04L 45/72* (2013.01); *H04L 47/10* (2013.01); *H04L 49/90* (2013.01); *H04L 49/901* (2013.01); *H04L 1/0057* (2013.01)

(56) References Cited

U.S. PATENT DOCUMENTS

| | | | |
|---|---|---|---|
| 5,214,501 A | 5/1993 | Cavallerano et al. | |
| 5,287,384 A | 2/1994 | Avery et al. | |
| 5,351,016 A | 9/1994 | Dent | |
| 5,420,640 A | 5/1995 | Munich et al. | |
| 5,422,913 A | 6/1995 | Wilkinson | |
| 5,524,116 A | 6/1996 | Kalmanek, Jr. et al. | |
| 5,563,915 A | 10/1996 | Stewart | |
| 5,596,604 A | 1/1997 | Cioffi et al. | |
| 5,635,864 A | 6/1997 | Jones | |
| 5,663,910 A | 9/1997 | Ko et al. | |
| 5,675,585 A | 10/1997 | Bonnot et al. | |
| 5,737,337 A | 4/1998 | Voith et al. | |
| 5,745,275 A | 4/1998 | Giles et al. | |
| 5,751,338 A | 5/1998 | Ludwig, Jr. | |
| 5,751,741 A | 5/1998 | Voith et al. | |
| 5,757,416 A | 5/1998 | Birch et al. | |
| 5,764,649 A | 6/1998 | Tong | |
| 5,764,693 A | 6/1998 | Taylor et al. | |
| 5,793,759 A | 8/1998 | Rakib et al. | |
| 5,835,527 A | 11/1998 | Lomp | |
| 5,867,400 A | 2/1999 | El-Ghoroury et al. | |
| 5,898,698 A | 4/1999 | Bross | |
| 5,903,612 A | 5/1999 | Van Der Puttent et al. | |
| 5,905,874 A | 5/1999 | Johnson | |
| 5,912,898 A | 6/1999 | Khoury | |
| 5,917,340 A | 6/1999 | Manohar et al. | |
| 5,968,200 A | 10/1999 | Amrany | |
| 5,983,382 A | 11/1999 | Pauls | |
| 5,991,857 A | 11/1999 | Koetje et al. | |
| 5,995,539 A | 11/1999 | Miller | |
| 6,005,851 A | 12/1999 | Craddock et al. | |
| 6,041,057 A | 3/2000 | Stone | |
| 6,081,291 A | 6/2000 | Ludwig, Jr. | |
| 6,098,188 A | 8/2000 | Kalmanek, Jr. et al. | |
| 6,151,690 A | 11/2000 | Peeters | |
| 6,226,322 B1 | 5/2001 | Mukherjee | |
| 6,266,337 B1 | 7/2001 | Marco | |
| 6,308,278 B1 | 10/2001 | Khouli et al. | |
| 6,337,877 B1 | 1/2002 | Cole et al. | |
| 6,381,728 B1 | 4/2002 | Kang | |
| 6,392,572 B1 | 5/2002 | Shiu et al. | |
| 6,421,323 B1 | 7/2002 | Nelson et al. | |
| 6,473,418 B1 | 10/2002 | Laroia et al. | |
| 6,480,976 B1 | 11/2002 | Pan et al. | |
| 6,484,283 B2 | 11/2002 | Stephen et al. | |
| 6,496,481 B1 | 12/2002 | Wu et al. | |
| 6,498,806 B1 | 12/2002 | Davis | |
| 6,542,500 B1 | 4/2003 | Gerszberg et al. | |
| 6,553,534 B2 | 4/2003 | Young, III et al. | |
| 6,578,162 B1 | 6/2003 | Yung | |
| 6,640,239 B1 | 10/2003 | Gidwani | |
| 6,657,949 B1 | 12/2003 | Jones, IV et al. | |
| 6,704,848 B2 | 3/2004 | Song | |
| 6,707,822 B1 | 3/2004 | Fadavi-Ardekani et al. | |
| 6,738,370 B2 | 5/2004 | Ostman | |
| 6,754,188 B1 | 6/2004 | Garahi et al. | |
| 6,754,290 B1 | 6/2004 | Halter | |
| 6,775,320 B1 | 8/2004 | Tzannes et al. | |
| 6,778,589 B1 | 8/2004 | Ishii | |
| 6,778,596 B1 | 8/2004 | Tzannes | |
| 6,826,589 B2 | 11/2004 | Berrada | |
| 6,865,233 B1 | 3/2005 | Eriksson et al. | |
| 6,885,696 B2 | 4/2005 | Wingrove | |
| 6,904,537 B1 | 6/2005 | Gorman | |
| 6,922,444 B1 | 7/2005 | Cai et al. | |
| 6,956,872 B1 | 10/2005 | Djokovic et al. | |
| 6,988,234 B2 | 1/2006 | Han | |
| 7,024,592 B1 | 4/2006 | Voas et al. | |
| 7,027,782 B2 | 4/2006 | Moon et al. | |
| 7,031,259 B1 | 4/2006 | Guttman et al. | |
| 7,042,891 B2 * | 5/2006 | Oberman et al. | ............ 370/412 |
| 7,050,552 B2 | 5/2006 | Comisky | |
| 7,058,085 B2 | 6/2006 | Earnshaw et al. | |
| 7,103,096 B2 | 9/2006 | Mitlin et al. | |
| 7,164,654 B2 | 1/2007 | Hunzinger et al. | |
| 7,174,493 B2 | 2/2007 | Matsumoto et al. | |
| 7,187,708 B1 | 3/2007 | Shiu et al. | |
| 7,200,138 B2 | 4/2007 | Liu | |
| 7,200,169 B2 | 4/2007 | Suzuki et al. | |
| 7,200,792 B2 | 4/2007 | Kim et al. | |
| 7,203,206 B2 | 4/2007 | Amidan et al. | |
| 7,224,702 B2 | 5/2007 | Lee | |
| 7,266,132 B1 | 9/2007 | Liu et al. | |
| 7,269,208 B2 | 9/2007 | Mazzoni et al. | |
| 7,272,768 B2 | 9/2007 | Chang et al. | |
| 7,302,379 B2 | 11/2007 | Cioffi et al. | |
| 7,400,688 B2 | 7/2008 | Garrett | |
| 7,483,421 B2 | 1/2009 | Compton | |
| 7,519,124 B2 | 4/2009 | Oksman et al. | |
| 7,600,172 B2 | 10/2009 | Berens et al. | |
| 7,657,818 B2 | 2/2010 | Cioffi et al. | |
| 7,668,101 B1 | 2/2010 | Raissinia et al. | |
| 7,764,595 B2 | 7/2010 | Treigherman | |
| 7,782,758 B2 | 8/2010 | Wydrowski et al. | |
| 7,826,438 B1 | 11/2010 | Salhotra et al. | |
| 7,831,890 B2 | 11/2010 | Tzannes et al. | |
| 7,836,381 B1 | 11/2010 | Tzannes et al. | |
| 7,844,882 B2 | 11/2010 | Tzannes et al. | |
| 7,933,295 B2 | 4/2011 | Thi et al. | |
| 8,074,138 B2 | 12/2011 | Chae et al. | |
| 8,149,904 B2 | 4/2012 | Efland et al. | |
| 8,276,048 B2 | 9/2012 | Tzannes et al. | |
| 8,335,956 B2 | 12/2012 | Tzannes | |
| 8,407,546 B2 | 3/2013 | Tzannes | |
| 8,468,411 B2 | 6/2013 | Tzannes | |
| 8,495,473 B2 | 7/2013 | Tzannes et al. | |
| 8,595,577 B2 | 11/2013 | Tzannes | |
| 8,607,126 B1 | 12/2013 | Tzannes et al. | |

(56) References Cited

U.S. PATENT DOCUMENTS

| | | |
|---|---|---|
| 8,645,784 B2 | 2/2014 | Tzannes |
| 8,775,890 B2 | 7/2014 | Yap et al. |
| 2001/0014962 A1 | 8/2001 | Obuchi et al. |
| 2001/0039637 A1 | 11/2001 | Bengough |
| 2002/0015401 A1 | 2/2002 | Subramanian et al. |
| 2002/0087710 A1 | 7/2002 | Aiken et al. |
| 2002/0126675 A1 | 9/2002 | Yoshimura et al. |
| 2002/0154600 A1 | 10/2002 | Ido et al. |
| 2003/0008821 A1 | 1/2003 | Detmar et al. |
| 2003/0009717 A1 | 1/2003 | Fukushima et al. |
| 2003/0014709 A1 | 1/2003 | Miyoshi et al. |
| 2003/0067877 A1 | 4/2003 | Sivakumar et al. |
| 2003/0076870 A1 | 4/2003 | Moon et al. |
| 2003/0088821 A1 | 5/2003 | Yokokawa et al. |
| 2003/0093750 A1 | 5/2003 | Cameron |
| 2003/0131209 A1 | 7/2003 | Lee |
| 2003/0179770 A1 | 9/2003 | Reznic et al. |
| 2004/0109455 A1 | 6/2004 | Jouppi et al. |
| 2004/0114536 A1 | 6/2004 | O'Rourke |
| 2004/0120435 A1 | 6/2004 | Yang et al. |
| 2004/0148552 A1 | 7/2004 | Matsumoto et al. |
| 2004/0179494 A1 | 9/2004 | Attar et al. |
| 2004/0196786 A1 | 10/2004 | Laha et al. |
| 2004/0203455 A1 | 10/2004 | Bao et al. |
| 2005/0034046 A1 | 2/2005 | Berkmann et al. |
| 2005/0036497 A1 | 2/2005 | Kawakami |
| 2005/0068916 A1 | 3/2005 | Jacobsen et al. |
| 2005/0079889 A1 | 4/2005 | Vaglica et al. |
| 2005/0180323 A1 | 8/2005 | Beightol et al. |
| 2005/0204251 A1 | 9/2005 | Moon et al. |
| 2005/0254441 A1 | 11/2005 | Levi et al. |
| 2005/0254508 A1 | 11/2005 | Aksu et al. |
| 2006/0089833 A1 | 4/2006 | Su et al. |
| 2006/0092871 A1 | 5/2006 | Nishibayashi et al. |
| 2006/0236045 A1 | 10/2006 | Keyes, Jr. |
| 2007/0198898 A1 | 8/2007 | Ysebaert et al. |
| 2007/0206621 A1 | 9/2007 | Plamondon et al. |
| 2007/0263528 A1 | 11/2007 | Mukherjee |
| 2008/0212582 A1 | 9/2008 | Zwart et al. |
| 2009/0319854 A1 | 12/2009 | Qian et al. |
| 2010/0061376 A1 | 3/2010 | Shimizu |
| 2014/0068366 A1 | 3/2014 | Tzannes |
| 2014/0075128 A1 | 3/2014 | Tzannes et al. |
| 2014/0133491 A1 | 5/2014 | Tzannes |

FOREIGN PATENT DOCUMENTS

| | | |
|---|---|---|
| EP | 1225735 | 7/2002 |
| EP | 1246409 | 10/2002 |
| EP | 1271833 | 1/2003 |
| EP | 1361690 | 11/2003 |
| EP | 1385292 | 1/2004 |
| EP | 1507353 | 2/2005 |
| EP | 1367809 | 1/2006 |
| GB | 2389493 | 12/2003 |
| JP | 06-164648 | 6/1994 |
| JP | 07-254862 | 10/1995 |
| JP | H09-247048 | 9/1997 |
| JP | H11-150764 | 6/1999 |
| JP | H11-355254 A | 12/1999 |
| JP | 2000-341247 | 12/2000 |
| JP | 2001-119437 | 4/2001 |
| JP | 2002-084338 | 3/2002 |
| JP | 2002-118527 | 4/2002 |
| JP | 2003-008553 | 1/2003 |
| JP | 2003-509966 | 3/2003 |
| JP | 2003-224615 | 8/2003 |
| JP | 2004-007269 | 1/2004 |
| JP | 2004-007823 | 1/2004 |
| JP | 2004-030506 | 1/2004 |
| JP | 2004-056221 | 2/2004 |
| JP | 2004-135013 | 4/2004 |
| JP | 2005-064594 | 3/2005 |
| JP | 2005-191735 | 7/2005 |
| JP | 2005-522963 | 7/2005 |
| JP | 2005-526422 | 9/2005 |
| KR | 10-2000-0047827 | 7/2000 |
| KR | 10-0295086 B1 | 4/2001 |
| KR | 10-2004-0009928 | 1/2004 |
| KR | 10-2004-0014977 | 2/2004 |
| WO | WO 98/47238 | 10/1998 |
| WO | WO 00/41395 | 7/2000 |
| WO | WO 00/52834 | 9/2000 |
| WO | WO 01/11833 | 2/2001 |
| WO | WO 01/20865 | 3/2001 |
| WO | WO 03/003747 | 1/2003 |
| WO | WO 03/028296 | 4/2003 |
| WO | WO 03/063060 | 7/2003 |
| WO | WO 03/090011 | 10/2003 |

OTHER PUBLICATIONS

"ITU-T Recommendation G.992.5-Series G: Transmission Systems and Media, Digital Systems and Networks", International Telecommunication Union, ADSL2, May 2003, 92 pages.

"ITU-T Recommendation G.992.3," International Telecommunication Union, ADSL2, Jan. 2005, 436 pages.

"VDSL2 ITU-T Recommendation G.993.2," International Telecommunication Union, Feb. 2006, 252 pages.

"Sunset xDSL: Prequalification of ADSL Circuits with ATU-C Emulation," Sunrise Telecom Inc., Application Series, 2001, San Jose, USA, p. 3, available at http://www.sunrisetelecom.com/technotes/APP-xDSL-8B.pdf.

International Search Report for International (PCT) Patent Application No. PCT/US2005/036015, mailed Feb. 8, 2006.

Written Opinion for International (PCT) Patent Application No. PCT/US2005/036015, mailed Feb. 8, 2006.

International Preliminary Report on Patentability for International (PCT) Patent Application No. PCT/US2005/036015, mailed Apr. 26, 2007.

Examiner's First Report for Australian Patent Application No. 2005296086, mailed Jun. 24, 2009.

Examiner's First Report for Australian Patent Application No. 2011201250 mailed May 13, 2013.

Examiner's Report for Canadian Patent Application No. 2,580,280, mailed Sep. 14, 2012.

Notice of Allowance for Canadian Patent Application No. 2,580,280, mailed Aug. 5, 2013.

Examiner's Report for Canadian Patent Application No. 2,869,452, mailed Dec. 15, 2014.

Notification of the First Office Action (including translation) for Chinese Patent Application No. 200580032703, mailed Sep. 25, 2009.

Official Action (including translation) for Chinese Patent Application No. 200580032703, dispatched May 18, 2011.

Official Action (including translation) for Chinese Patent Application No. 200580032703.1, dispatched Mar. 28, 2012.

Decision of Refusal (including translation) for Chinese Patent Application No. 200580032703.1, dispatched Sep. 5, 2012.

Notification of Reexamination (including translation) for Chinese Patent Application No. 200580032703.1, dispatched Oct. 29, 2014.

Reexamination Decision (including translation) for Chinese Patent Application No. 200580032703.1, dispatched Apr. 14, 2015.

Official Action for European Application No. 05807443.6, mailed Mar. 6, 2013.

First Examination Report for Indian Patent Application No. 1208/KOLNP/2007, mailed Mar. 18, 2013.

Official Action (translation only) for Korean Patent Application No. 10-2007-7008270, mailed Jun. 30, 2011.

Notice of Allowance (including translation) for Korean Patent Application No. 10-2007-7008270, mailed Mar. 29, 2012.

Official Action (translation only) for Korean Patent Application No. 10-2010-7022463, mailed Jun. 30, 2011.

Notice of Allowance (including translation) for Korean Patent Application No. 10-2010-7022463, mailed Mar. 29, 2012.

Official Action (including translation) for Japanese Patent Application No. 2007-535818, dispatched Jul. 11, 2011.

(56) References Cited

OTHER PUBLICATIONS

Notice of Allowance (Including Translation) for Japanese Patent Application No. 2007-535818, dispatched Dec. 12, 2011.
Official Action (including translation) for Japanese Patent Application No. 2008-264540, dispatched Jul. 11, 2011.
Official Action (including translation) for Japanese Patent Application No. 2008-264540, dispatched Dec. 12, 2011.
Notice of Allowance for Japanese Patent Application No. 2008-264540, mailed Mar. 26, 2012.
Invitation to Pay Additional Fees (including partial international search report) for International (PCT) Patent Application No. PCT/US2007/066522, mailed Feb. 6, 2008.
International Search Report for International (PCT) Patent Application No. PCT/US2007/066522, mailed Apr. 14, 2008.
Written Opinion for International (PCT) Patent Application No. PCT/US2007/066522, mailed Apr. 14, 2008.
International Preliminary Report on Patentability for International (PCT) Patent Application No. PCT/US2007/066522, mailed Oct. 23, 2008.
Examiner's First Report on Australian Patent Application No. 2007257055, mailed Mar. 30, 2010.
Examiner's Report for Canadian Patent Application No. 2,647,589, mailed Dec. 16, 2013.
Examiner's Report for Canadian Patent Application No. 2,647,589, mailed Feb. 26, 2015.
Official Action (including translation) for Chinese Patent Application No. 200780012891.0, dispatched Mar. 16, 2011.
Notification of the Second Office Action (including translation) for Chinese Patent Application No. 200780012891.0, dispatched Mar. 7, 2012.
Notification of the Second Office Action (including translation) for Chinese Patent Application No. 200780012891.0, dispatched Dec. 12, 2012.
Official Action for Columbian Patent Application No. 08-109-377, dated Nov. 5, 2010.
Examination Report for European Patent Application No. 07811844.5, mailed Apr. 1, 2009.
Official Action for European Patent Application No. 07811844.5, dated Jul. 9, 2010.
Official Action for European Patent Application No. 07811844,5, dated Dec. 21, 2010.
Official Action for European Patent Application No. 07811844.5, dated Dec. 18, 2012.
European Search Report and Opinion for European Patent Application No. 10000017.3, dated Mar. 17, 2010.
Official Action for European Patent Application No. 10000017.3, dated Nov. 20, 2013.
European Search Report and Opinion for European Patent Application No. 10000016.5, dated Mar. 3, 2010.
Official Action for European Patent Application No. 10000016.5, dated Nov. 3, 2010.
Official Action for European Patent Application No. 100000165, dated Dec, 22, 2011.
Communication Under Rule 71(3) EPC—Intention to Grant for European Patent Application No. 10000016.5, dated Dec. 18, 2012.
Decision to Grant a European Patent Pursuant to Article 97(1) EPC for European Patent Application No. 10000016.5, dated May 31, 2013.
Official Action for Japanese Patent Application No. 2009-505623, dispatched Apr, 4, 2011.
Official Action (including translation) for Japanese Patent Application No. 2009-505623, dispatched Oct. 31, 2011.
Official Action for Japanese Patent Application No. 2010-017356, dispatched Apr. 18, 2011.
Official Action (including translation) for Japanese Patent Application No. 2010-017356, dispatched Aug. 29, 2011.
Decision of Final Rejection (Including Translation) for Japanese Patent Application No. 2010-017356, dispatched Apr. 23, 2012.
Official Action for Japanese Patent Application No. 2012-042978, dispatched Jun. 3, 2013.
Notice of Allowance for Japanese Patent Application No. 2012-042978, dispatched Feb. 17, 2014.
Official Action for Japanese Patent Application No. 2013-246257 dispatched Jan. 26, 2015.
Official Action for Korean Patent Application No. 10-2008-7024792, mailed Aug. 29, 2013.
Official Action (including translation) for Korean Patent Application No. 10-2008-7024792 dated Feb. 23, 2015.
Official Action (including translation) for Korean Patent Application No. 10-2014-7005299 mailed Apr. 4, 2014.
Official Action (including translation) for Korean Patent Application No. 10-2014-7005299 mailed Feb. 23, 2015.
Official Action (including translation) for Mexican Patent Application No. MX/a/2008/012505, dated Apr. 22, 2010.
Official Action (including translation) for Mexican Patent Application No. MX/a/2008/012505, dated Aug. 9, 2011.
Official Notification of Intent to Grant (including translation) for Mexican Patent Application No. MX/a/2008/012505, mailed Apr. 3, 2012.
Official Action (including translation) for Mexican Patent Application No. MX/a/2011/005751, dated Jun. 6, 2013.
Official Action for U.S. Appl. No. 11/246,163, mailed Feb. 24, 2009.
Official Action for U.S. Appl. No. 11/246,163, mailed Dec. 9, 2009.
Notice of Allowability for U.S. Appl. No. 11/246,163, mailed Sep. 7, 2010.
Notice of Allowability for U.S. Appl. No. 12/761,586, mailed Oct. 6, 2010.
Notice of Allowability for U.S. Appl. No. 12/853,020, mailed Oct. 6, 2010.
Official Action for U.S. Appl. No. 12/901,699, mailed Jan. 6, 2012.
Notice of Allowance for U.S. Appl. No. 12/901,699, mailed Jul. 27, 2012.
Official Action for U.S. Appl. No. 13/567,261, mailed Sep. 28, 2012.
Notice of Allowance for U.S. Appl. No. 13/567,261, mailed May 21, 2013.
Official Action for U.S. Appl. No. 13/942,938, mailed Sep. 25, 2013.
Notice of Allowance for U.S. Appl. No. 13/942,938, mailed Oct. 8, 2013.
Official Action for U.S. Appl. No. 14/081,469 mailed Dec. 17, 2014.
Notice of Allowance for U.S. Appl. No. 14/081,469, mailed Apr. 3, 2015.
Official Action for U.S. Appl. No. 12/295,828, mailed Jan. 5, 2012.
Notice of Allowance for U.S. Appl. No. 12/295,828, mailed Aug. 17, 2012.
Notice of Allowance for U.S. Appl. No. 12/783,758, mailed Dec. 26, 2012.
Official Action for U.S. Appl. No. 13/766,059, mailed Oct. 2, 2013.
Notice of Allowance for U.S. Appl. No. 13/766,059, mailed Nov. 25, 2013.
Official Action for U.S. Appl. No. 14/159,125, mailed Feb. 6, 2015.
Official Action for U.S. Appl. No. 12/760,728, mailed Apr. 27, 2012.
Official Action for U.S. Appl. No. 12/760,728, mailed Jan. 2, 2013.
Official Action for U.S. Appl. No. 12/760,728, mailed Jun. 20, 2013.
Official Action for U.S. Appl. No. 12/760,728, mailed Oct. 2, 2013.
Notice of Allowance for U.S. Appl. No. 12/760,728, mailed Oct. 21, 2013.
Official Action for U.S. Appl. No. 12/783,765, mailed May 17, 2012.
Official Action for U.S. Appl. No. 12/783,765, mailed Dec. 17, 2012.
Notice of Allowance for U.S. Appl. No. 21/783,765, mailed May 9, 2013.
Official Action for U.S. Appl. No. 14/075,194, mailed Jan. 28, 2015.
Notice of Allowance for U.S. Appl. No. 14/075,194, mailed Apr. 8, 2015.
U.S. Appl. No. 60/078,549, filed Mar. 19, 1998, Jacobsen et al.
Aramvith, Supavadee et al. "Wireless Video Transport Using Conditional Retransmission and Low-Delay Interleaving" IEEE 2001 (4 pages).
Bauer, Rainer et al. "Iterative Source/Channel-Decoding Using Reversible Variable Length Codes" Munich University of Technology, 2000 (10 pages).
Business Wire "New FatPipe T1 Speed Product Produces Speeds up to 4.5Mbps and Redundancy for a Fraction of the Cost of a Fractional T3!" Business Wire, Oct. 16, 1998 (2 pages).

(56) References Cited

OTHER PUBLICATIONS

Buzzard, Greg et al., "An Implementation of the Hamlyn Sender-Managed Interface Architecture" The Second Symposium on Operating Systems Design and Implementation (OSDI '96) Proceedings (Seattle, WA), Oct. 28-31, 1996 (15 pages).
Cisco Systems, Inc. "Alternatives for High Bandwidth Connections Using Parallel T1/E1 Links" 1998 (8 pages).
Eberle, Wolfgang et al. "80-Mb/S QPSK and 72-Mb/s 64-QAM Flexible and Scalable Digital OFDM Transceiver ASICs for Wireless Local Area Networks in the 5-GHz Band" IEEE Journal of Solid-State Circuits, vol. 36, No. 11, Nov. 2001 (10 pages).
Goodman, David et al. "Maximizing the Throughput to CDMA Data Communications" Polytechnic University, Brooklyn, NY (5 pages).
ITU-T Recommendation G.992.1, "Series G: Transmission Systems and Media, Digital Systems and Networks" Jun. 1999 (256 pages).
ITU-T Recommendation G.992.3, "Asymmetric Digital Subscriber Line Transceivers 2 (ADSL2)" International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
ITU-T Recommendation G.993.1 "Very High Speed Digital Subscriber Line Transceivers" Jun. 2004 (228 pages).
ITU-T SG15/Q4 Contribution LB-031 "VDSL2—Constraining the Interleaver Complexity" Texas Instruments, Inc. Jun. 2004 (7 pages).
Johns, David A., et al. "Integrated Circuits for Data Transmission Over Twisted-Pair Channels" IEEE Journal of Solid-State Circuits, vol. 32, Nov. 3, Mar. 1997 (9 pages).
Petzold, Mark C. et al. "Multicarrier Spread Spectrum Performance in Fading Channels with Serial Concatenated Convolutional Coding" IEEE 1998 (4 pages).
Sklower, K. et al. "The PPP Multilink Protocol (MP)" Network Working Group, Nov. 1994 (15 pages).
Wolman, Alec et al. "Latency Analysis of TCP on an ATM Network" University of Washington, Printed Sep. 19, 2014 (14 pages).
Yamada, Hitoshi et al. "QoS Control by Traffic Engineering in Content Delivery Networks" Fujitsu Science and Technology Journal, Dec. 2003 (11 pages).
Official Action or European Patent Application No. 10000017.3, dated Oct. 20, 2015.
Official Action (Including Translation) for Japanese Patent Application No. 2013-246257 dispatched Nov. 16, 2015.
Documents filed with District Court Proceedings for *TQ Delta, LLC v. 2Wire, Inc.*; U.S. District Court, for the District of Delaware (Wilmington); Civil Action No. 1:13-cv-01835-RGA; Includes documents filed from Nov. 4, 2013-Oct. 19, 2015—Docket Nos. 1-122; (3,844 pages).
Defendant 2Wire, Inc.'s Preliminary Invalidity Contentions with Regard to Representative Asserted Claims for *TQ Delta, LLC v. 2Wire, Inc.*—Including Claim Charts for Family 3 with Exhibits F-1 to F-9 and G-1 to G-25; In the United States District Court for the District of Delaware; Civil Action No. 13-01835-RGA; filed Sep. 24, 2015 (539 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Nov. 4, 2013-Nov. 30, 2015—Docket Nos. 1-100; (1722 pages).

Defendant Zhone Technologies, Inc.'s Invalidity Contentions with Regard to Representative Asserted Claims for *TQ Delta, LLC v. Zhone Technologies, Inc.*—Including Claim Charts for Family 3 with Exhibits 43-79; In the United States District Court for the District of Delaware; Civil Action No. 13-01836-RGA; filed Sep. 25, 2015 (961 pages).
Defendant Zhone Technologies, Inc.'s Invalidity Contentions with Regard to Representative Asserted Claims for *TQ Delta, LLC v. Zhone Technologies, Inc.*—Including Claim Charts for Family 9 with Exhibits 138-150; In the United States District Court for the District of Delaware; Civil Action No. 13-01836-RGA; filed Sep. 25, 2015 (246 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2013-Nov. 30, 2015—Docket Nos. 1-117; 1996 pages).
Defendant Zyxel's Initial Invalidity Contentions with Respect to Representative Asserted Claims for *TQ Delta, LLC v. Zyxel Communications, Inc. and Zyxel Communications Corporation*—Including Claim Charts for Family 3 with Exhibits C1-C36; In the United States District Court for the District of Delaware; Civil Action No. 13-02013-RGA; filed Sep. 25, 2015 (729 pages).
Defendant Zyxel's Initial Invalidity Contentions with Respect to Representative Asserted Claims for *TQ Delta, LLC v. Zyxel Communications, Inc. and Zyxel Communications Corporation*—Including Claim Charts for Family 9 with Exhibits J2-J13; In the United States District Court for the District of Delaware; Civil Action No. 13-2013-RGA; filed Sep. 25, 2015 (236 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2014-Oct. 19, 2015—Docket Nos. 1-65; (2,489 pages).
U.S. Appl. No. 14/742,334, filed Jun. 17, 2015, Tzannes.
Notice of Allowance for Canadian Patent Application No. 2,869,452, mailed Apr. 20, 2015.
Official Action for U.S. Appl. No. 14/159,125, mailed Jun. 16, 2015.
Notice of Acceptance for Australian Patent Application No. 2015200618 mailed Jul. 15, 2015.
Official Action for European Application No. 05807443.6, mailed Dec. 8, 2015.
Official Action (including translation) for Korean Patent Application No. 10-2008-7024792 dated Dec. 14, 2015.
Official Action (including translation) for Korean Patent Application No. 10-2014-7005299 mailed Dec. 14, 2015.
Official Action for U.S. Appl. No. 14/159,125, mailed Dec. 31, 2015.
Documents filed with District Court Proceedings for to *Delta, LLC v. 2WIRE, Inc.*; U.S. District Court, for the District of Delaware (Wilmington); Civil Action No. 1:13-cv-01835-RGA; Includes documents filed from Nov. 10, 2015-Jan. 5, 2016; (102 pages).
Documents filed with District Court Proceedings for to *Delta, LLC v. Zhone Technologies Inc.*; U.S. District Court, for the District of Delaware (Wilmington); Civil Action No. 1:13-cv-01836-RGA; Includes documents filed from Dec. 16, 2015-Jan. 6, 2016; (193 pages).
Documents filed with District Court Proceedings for *TQ Delta, LLC v. Zyxel Communications Inc, et al.*; U.S. District Court, for the District of Delaware (Wilmington); Civil Action No. 1:13-cv-02013-RGA; Includes documents filed from Dec. 16, 2015-Dec. 16, 2015; (48 pages).

\* cited by examiner

RESOURCE SHARING IN A TELECOMMUNICATIONS ENVIRONMENT

RELATED APPLICATION DATA

This application is a Continuation of U.S. application Ser. No. 14/081,469, filed Nov. 15, 2013, now U.S. Pat. No. 9,069, 718, which is a Continuation of U.S. application Ser. No. 13/942,938, filed Jul. 16, 2013, now U.S. Pat. No. 8,607,126, which is a Continuation of U.S. application Ser. No. 13/567, 261, filed Aug. 6, 2012, now U.S. Pat. No. 8,495,473, which is a Continuation of U.S. application Ser. No. 12/901,699, filed Oct. 11, 2010, now U.S. Pat. No. 8,276,048, which is a Continuation of Ser. No. 12/761,586, filed Apr. 16, 2010, now U.S. Pat. No. 7,844,882, which is a Continuation of U.S. application Ser. No. 11/246,163 filed Oct. 11, 2005, now U.S. Pat. No. 7,831,890, which claims the benefit of and priority under 35 U.S.C. §119(e) to U.S. Patent Application No. 60/618,269, filed Oct. 12, 2004, entitled "Sharing Memory and Processing Resources in DSL Systems," each of which are incorporated herein by reference in their entirety.

BACKGROUND

1. Field of the Invention

This invention generally relates to communication systems. More specifically, an exemplary embodiment of this invention relates to memory sharing in communication systems. Another exemplary embodiment relates to processing or coding resource sharing in a communication system.

2. Description of Related Art

U.S. Pat. Nos. 6,775,320 and 6,778,596 describe DSL systems supporting multiple applications and multiple framer/coder/interleaver FCI blocks (an FCI block is also referred to as a latency path). DSL systems carry applications that have different transmission requirements with regard to, for example, data rate, latency (delay), bit error rate (BER), and the like. For example, video typically requires a low BER (<1E–10) but can tolerate higher latency (>20 ms). Voice, on the other hand, typically requires a low latency (<1 ms) but can tolerate BER (>1E–3).

As described in U.S. Pat. No. 6,775,320, different applications can use different latency paths in order to satisfy the different application requirements of the communication system. As a result a transceiver must support multiple latency paths in order to support applications such as video, Internet access and voice telephony. When implemented in a transceiver, each of the latency paths will have a framer, coder, and interleaver block with different capabilities that depend on the application requirements.

SUMMARY

One difficulty with implementing multiple latency paths in a transceiver is the fact that a latency path is a complicated digital circuit that requires a large amount of memory and processing power. An interleaver within a latency path can consume a large amount of memory in order to provide error correcting capability. For example, a typical DSL transceiver will have at least one latency path with approximately 16 kbytes of memory for the interleaver. Likewise, the coding block, for example, a Reed Solomon coder, consumes a large amount of processing power. In general, as the number of latency paths increase, the memory and processing power requirements for a communication system become larger.

Accordingly, an exemplary aspect of this invention relates to sharing memory between one or more interleavers and/or deinterleavers in a transceiver. More particularly, an exemplary aspect of this invention relates to shared latency path memory in a transceiver.

Additional aspects of this invention relate to configuring and initializing shared memory in a communication system. More particularly, an exemplary aspect of this invention relates to configuring and initializing interleaver/deinterleaver memory in a communication system.

Additional aspects of the invention relate to determining the amount of memory that can be allocated to a particular component by a communication system. More specifically, an exemplary aspect of the invention relates to determining the maximum amount of shared memory that can be allocated to one or more interleaves or deinterleavers.

According to another exemplary aspect of the invention, processing power is shared between a number of transceiver modules. More specifically, and in accordance with an exemplary embodiment of the invention, a coding module is shared between one or more coders and/or decoders.

Another exemplary embodiment of the invention relates to transitioning from a fixed memory configuration to a shared memory configuration during one or more of initialization and SHOWTIME (user data transmission).

An additional exemplary aspect of the invention relates to dynamically updating one or more of shared memory and processing resources based on changing communication conditions.

An additional exemplary aspect of the invention relates to updating one or more of shared memory and processing resources based on an updated communication parameter.

An additional exemplary aspect of the invention relates to updating the allocation of one or more of shared memory and processing resources based on an updated communication parameter(s).

Additional aspects of the invention relate to exchanging shared resource allocations between transceivers.

Additional exemplary aspects relate to a method of allocating shared memory in a transceiver comprising allocating the shared memory to a plurality of modules, wherein each of the plurality of modules comprise at least one interleaver, at least one deinterleaver or a combination thereof.

Still further aspects relate to the above method wherein the plurality of modules comprise interleavers.

Still further aspects relate to the above method wherein the plurality of modules comprise deinterleavers.

Still further aspects relate to the above method wherein the plurality of modules comprise at least one interleaver and at least one deinterleaver.

Additional exemplary aspects relate to a transceiver comprising a plurality of modules each including at least one interleaver, at least one deinterleaver or a combination thereof and a shared memory designed to be allocated to a plurality of the modules.

Still further aspects relate to the above transceiver wherein the plurality of modules comprise interleavers.

Still further aspects relate to the above transceiver wherein the plurality of modules comprise deinterleavers.

Still further aspects relate to the above transceiver wherein the plurality of modules comprise at least one interleaver and at least one deinterleaver.

These and other features and advantages of this invention are described in, or are apparent from, the following description of the embodiments.

BRIEF DESCRIPTION OF THE DRAWINGS

The embodiments of the invention will be described in detail, with reference to the following figures, wherein.

DETAILED DESCRIPTION

Figure 1:
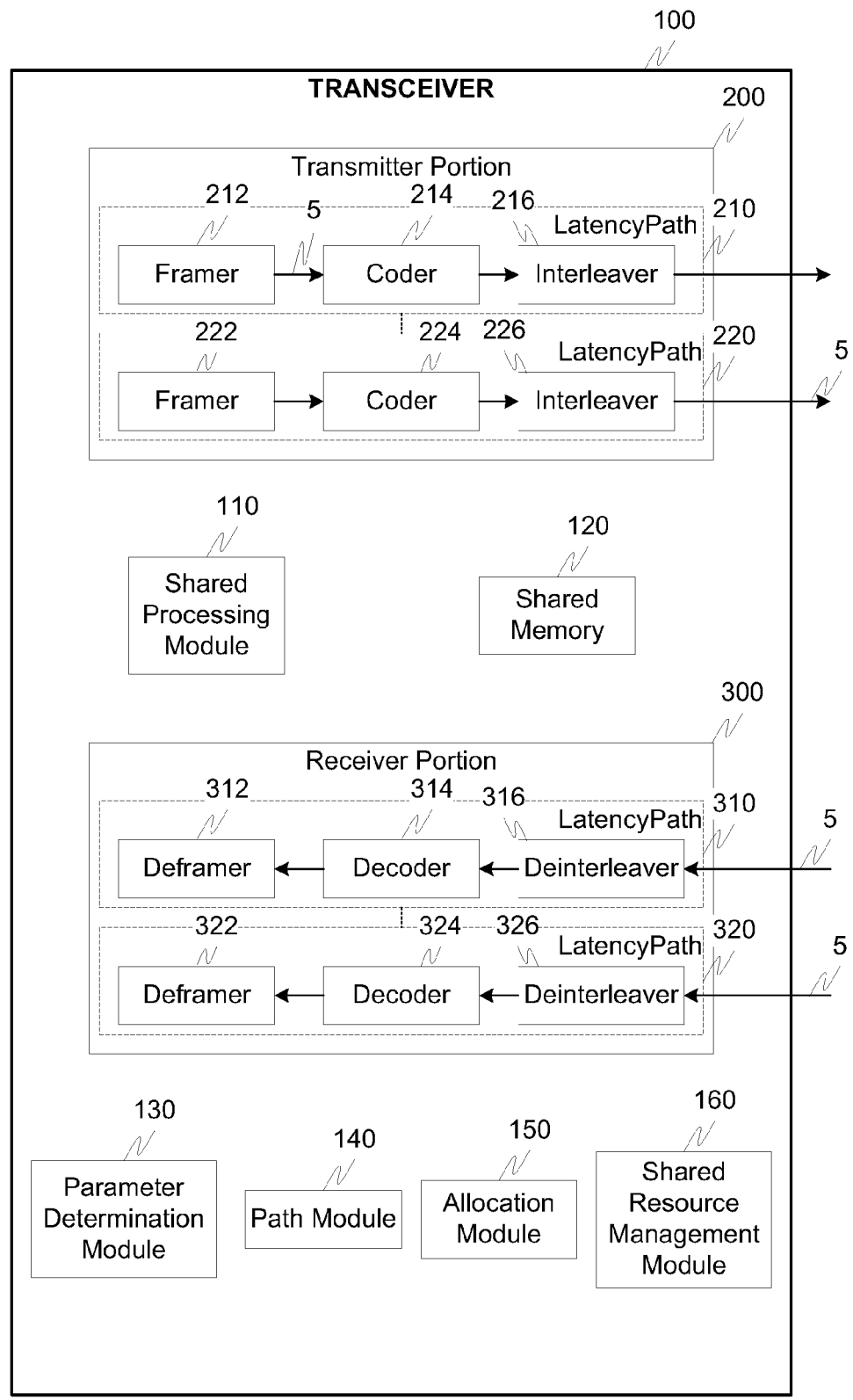
FIG. 1 is a functional block diagram illustrating an exemplary transceiver according to this invention.

The exemplary embodiments of this invention will be described in relation to sharing resources in a wired and/or wireless communications environment. However, it should be appreciated, that in general, the systems and methods of this invention will work equally well for any type of communication system in any environment.

The exemplary systems and methods of this invention will also be described in relation to multicarrier modems, such as DSL modems and VDSL modems, and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), a DSL management device, or some combination thereof. Similarly, one or more functional portions of the system could be distributed between a modem and an associated computing device.

Furthermore, it should be appreciated that the various links, including communications channel 5, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. FCI block and latency path are used interchangeably herein as well as transmitting modem and transmitting transceiver. Receiving modem and receiving transceiver are also used interchangeably.

FIG. 1 illustrates an exemplary embodiment of a transceiver 100 that utilizes shared resources. It should be appreciated that numerous functional components of the transceiver have been omitted for clarity. However, the transceiver 100 can also include the standard components found in typical communications device(s) in which the technology of the subject invention is implemented into.

According to an exemplary embodiment of the invention, memory and processing power can be shared among a plurality of transmitter and/or receiver latency paths, in a communications transceiver that carries or supports multiple applications. For example, the transmitter and/or receiver latency paths of the transceiver can share an interleaver/deinterleaver memory and the shared memory can be allocated to the interleaver and/or deinterleaver of each latency path. This allocation can be done based on the data rate, latency, BER, impulse noise protection requirements of the application, data or information being transported over each latency path, or in general any parameter associated with the communications system.

Likewise, for example, the transmitter and/or receiver latency paths can share a Reed-Solomon coder/decoder processing module and the processing power of this module can be allocated to each encoder and/or decoder. This allocation can be done based on the data rate/latency, BER, impulse noise protection requirements of the application data or information being transported over each latency path, or in general based on any parameter associated with the communication system.

In accordance with an exemplary operational embodiment, a first transceiver and a second transceiver transmit to one another messages during, for example, initialization which contain information on the total and/or shared memory capabilities of each transceiver and optionally information about the one or more latency paths. This information can be transmitted prior to determining how to configure the latency paths to support the application requirements. Based on this information, one of the modems can select an FCI configuration parameter(s) that meets the transmission requirements of each application being transported over each latency paths. While an exemplary of the embodiment of the invention will be described in relation to the operation of the invention and characteristics thereof being established during initialization, it should be appreciated that the sharing of resources can be modified and messages transmitted between a two transceivers at any time during initialization and/or user data transmission, i.e., SHOWTIME.

FIG. 1 illustrates an exemplary embodiment of a transceiver 100. The transceiver 100 includes a transmitter portion 200 and a receiver portion 300. The transmitter portion 200 includes one or more latency paths 210, 220, .... Similarly, the receiver portion 300 includes one or more latency paths 310, 320, .... Each of the latency paths in the transmitter portion 200 includes a framer, coder, and interleaver designated as 212, 214, 216 and 222, 224 and 226, respectively. Each of the latency paths in the receiver portion includes a deframer, decoder, and deinterleaver designated as 312, 314, 316 and 322, 324, and 326, respectively. The transceiver 100 further includes a shared processing module 110, a shared memory 120, a parameter determination module 130, a path module 140, an allocation module 150, and a shared resource management module 160, all interconnected by one or more links (not shown).

In this exemplary embodiment, the transceiver 100 is illustrated with four total transmitter portion and receiver portion latency paths, i.e., 210, 220, 310, and 320. The shared memory 120 is shared amongst the two transmitter portion interleavers 216 and 226 and two receiver portion deinterleavers 316 and 326. The shared processing module 110, such as a shared coding module, is shared between the two transmitter portion coders 214 and 224 and the two receiver portion decoders 314 and 324.

While the exemplary embodiment of the invention will be described in relation to a transceiver having a number of transmitter portion latency paths and receiver portion latency paths, it should be appreciated that this invention can be applied to any transceiver having any number of latency paths. Moreover, it should be appreciated that the sharing of resources can be allocated such that one or more of the transmitter portion latency paths are sharing a shared resource, one or more of the receiver portion latency paths are sharing a shared resource, or a portion of the transmitter portion latency paths and a portion of the receiver portion latency paths are sharing shared resources. Moreover, any one or more of the latency paths, or portions thereof, could also be assigned to a fixed resource while, for example, another portion of the latency path(s) assigned to a shared resource. For example, in latency path 210, the interleaver 216 could be allocated a portion of the shared memory 120, while the coder 214 could be allocated to a dedicated processing module, vice versa, or the like.

In accordance with the exemplary embodiment, a plurality of transmitter portion or receiver portion latency paths share an interleaver/deinterleaver memory, such as shared memory 120, and a coding module, such as shared processing module 110. For example, the interleaver/deinterleaver memory can be allocated to different interleavers and/or deinterleavers. This allocation can be based on parameters associated with the communication systems such as data rate, latency, BER, impulse noise protection, and the like, of the applications being transported. Similarly, a coding module, which can be a portion of the shared processing module 110, can be shared between any one or more of the latency paths. This sharing can be based on requirements such as data rate, latency, BER, impulse noise protection, and the like, of the applications being transported.

For example, an exemplary transceiver could comprise a shared interleaver/deinterleaver memory and could be designed to allocate a first portion of the shared memory 120 to an interleaver, such as interleaver 216 in the transmitter portion of the transceiver and allocate a second portion of the shared memory 120 to a deinterleaver, such as 316, in the receiver portion of the transceiver.

Alternatively, for example, an exemplary transceiver can comprise a shared interleaver/deinterleaver memory, such as shared memory 120, and be designed to allocate a first portion of shared memory 120 to a first interleaver, e.g., 216, in the transmitter portion of the transceiver and allocate a second portion of the shared memory to a second interleaver, e.g., 226, in the transmitter portion of the transceiver.

Alternatively, for example, an exemplary transceiver can comprise a shared interleaver/deinterleaver memory and be designed to allocate a first portion of the shared memory 120 to a first deinterleaver, e.g., 316, in the receiver portion of the transceiver and allocate a second portion of the shared memory to a second deinterleaver, e.g., 326, in the receiver portion of the transceiver. Regardless of the configuration, in general any interleaver or deinterleaver, or grouping thereof, be it in a transmitter portion or receiver portion of the transceiver, can be associated with a portion of the shared memory 120.

Establishment, configuration and usage of shared resources is performed in the following exemplary manner. First, and in cooperation with the path module 140, the number of transmitter and receiver latency paths (N) is determined. The parameter determination module 130 then analyses one or more parameters such as data rate, transmitter data rate, receiver data rate, impulse noise protection, bit error rate, latency, or the like. Based on one or more of these parameters, the allocation module 150 allocates a portion of the shared memory 120 to one or more of the interleaver and/or deinterleavers, or groupings thereof. This process continues until the memory allocation has been determined and assigned to each of the N latency paths.

Having determined the memory allocation for each of the latency paths, and in conjunction with the shared resource management 160, the transceiver 100 transmits to a second transceiver one or more of the number of latency paths (N), the maximum interleaver memory for any one or more of the latency paths and/or the maximum total and/or shared memory for all of the latency paths.

Three examples of sharing interleaver/deinterleaver memory and coding processing in a transceiver are described below. The latency paths in these examples can be in the transmitter portion of the transceiver or the receiver portion of the transceiver.

EXAMPLE #1

A first transmitter portion or receiver portion latency path may carry data from a video application, which needs a very low BER but can tolerate higher latency. In this case, the video will be transported using an latency path that has a large amount of interleaving/deinterleaving and coding (also known as Forward Error Correction (FEC) coding). For example, the latency path may be configured with Reed-Solomon coding using a codeword size of 255 bytes (N=255) with 16 checkbytes (R=16) and interleaving/deinterleaving using an interleaver depth of 64 (D=64). This latency path will require N*D=255*64=16Kbytes of interleaver memory at the transmitter (or deinterleaver memory at the receiver). This latency path will be able to correct a burst of errors that is less than 512 bytes in duration.

A second transmitter portion or receiver portion latency path may carry an internet access application that requires a medium BER and a medium amount of latency. In this case, the internet access application will be transported using a latency path that has a medium amount of interleaving and coding. For example, the latency path may be configured with Reed-Solomon coding using a codeword size of 128 bytes (N=128) with 8 checkbytes (R=8) and interleaving using an interleaver depth of 16 (D=32). This latency path will require N*D=128*32=4Kbytes of interleaver memory and the same amount of deinterleaver memory. This latency path will be able to correct a burst of errors that is less than 128 bytes in duration.

A third transmitter portion or receiver portion latency path may carry a voice telephony application, which needs a very low latency but can tolerate BER. In this case, the video will be transported using an latency path that has a large amount of interleaving and coding. For example, the third transmitter portion or receiver portion latency path may be configured with no interleaving or coding which will result in the lowest possible latency through the latency path but will provide no error correction capability.

According to the principles of this invention, a system carrying the three applications described above in Example #1, would have three latency paths that share one memory space containing at least (16+4)=20 Kbytes. The three latency paths also share a common coding block that is able to simultaneously encode (in the transmitter portion) or decode (in a receiver portion) two codewords with N=255/R=16 and N=128/R=8.

According to an exemplary embodiment of this invention, the latency paths can be reconfigured at initialization or during data transmission mode (also known as SHOWTIME in ADSL and VDSL transceivers). This would occur if, for example, the applications or application requirements were to change.

EXAMPLE #2

If instead of 1 video application, 1 internet application and 1 voice application, there were 3 internet access applications then the transmitter portion and/or receiver portion latency paths would be reconfigured to utilize the shared memory and coding module in a different way. For example, the system could be reconfigured to have 3 transmitter portion or receiver portion latency paths, with each latency path being configured with Reed-Solomon coding using a codeword size of 128 bytes (N=128) with 8 checkbytes (R=8) and interleaving using an interleaver depth of 16 (D=32). Each latency path will require N*D=128*32=4Kbytes of interleaver memory and each block will be able to correct a burst of errors that is less than 128 bytes in duration. Based on the example of carrying the three internet access applications described, the three latency path share one memory space containing at least 3*4=12 Kbytes. Also the three latency paths share a common coding block that is able to simultaneously encode (on the transmitter side) or decode (on the receiver side) three codewords with N=128/R=16, N=128/R=8 and N=128/R=8.

EXAMPLE #3

The system could be configured to carry yet another set of applications. For example, the latency paths could be configured to carry 2 video applications. In this case only 2 transmitter portion or receiver portion latency paths are needed, which means that the third latency path could be simply disabled. Also, assuming that the memory is constrained based on the first example above, then the maximum shared memory for these 2 latency paths is 20 kBytes. In this case, the system could be reconfigured to have 2 latency paths, with each block being configured with Reed-Solomon coding using a codeword size of 200 bytes (N=200) with 10 checkbytes (R=10) and interleaving/deinterleaving using an interleaver depth of 50 (D=50). Each latency path will require N*D=200*50=10Kbytes of interleaver memory and each block will be able to correct a burst of errors that is less than 250 bytes in duration. This configuration results in 20K of shared memory for both latency paths, which is the same as in the first example. In order to stay within the memory constraints of the latency paths, the error correction capability for each latency path is decreased to 250 bytes from 512 bytes in Example #1.

Another aspect of this invention is the how FCI configuration information is transmitted between a first modem and a second modem. FCI configuration information will depend on the requirements of the applications being transported over the DSL connection. This information may need to be forwarded during initialization in order to initially configure the DSL connection. This information may also need to be forwarded during SHOWTIME in order to reconfigure the DSL connection based on a change in applications or the application requirements.

According to one embodiment, a first modem determines the specific FCI configuration parameters, e.g,. N, D, R as defined above, needed to meet specific application requirements, such as latency, burst error correction capability, etc. In order to determine the FCI configuration parameters, the first modem must know what are the capabilities of a second modem. For example, the first modem must know how many latency paths (FCI blocks) the second modem can support. Also the first modem must know the maximum amount of interleaver memory for each transmitter latency path. In addition, since the transmitter latency paths may share a common memory space the first modem must know the total shared memory for all transmitter latency paths. This way the first modem will be able to choose a configuration that can meet application requirements and also meet the transmitter portion latency path capabilities of the second modem.

For example, using values from examples above, a first transceiver could send a message to a second transceiver during initialization or during SHOWTIME containing the following information:
  Number of supported transmitter and receiver latency paths=3
  Max Interleaver Memory for latency path #1=16 Kbytes
  Max Interleaver Memory for latency path #2=16 Kbytes
  Max Interleaver Memory for latency path #3=16 Kbytes
  Maximum total/shared memory for all latency paths=20 kBytes Based on this information, and the application requirements, the first transceiver would select latency path settings. For example, if the applications are 1 video, 1 internet access and 1 voice application, the first transceiver could configure 3 latency paths as follows:
latency path #1—Video: N=255, R=16, D=64
latency path #2—Video: N=128, R=8, D=32
latency path #3—Video: N=0, R=0, D=1 (no coding or interleaving)
  This would result in a total interleaver memory of 20 kbytes.

Alternatively, if for example, there are only 2 video applications, the first transceiver could configure 2 latency paths as follows:
latency path #1—Video: N=200, R=10, D=50
latency path #2—Video: N=200, R=10, D=50
latency path #3—Video: N=0, R=0, D=1 (no coding or interleaving)
  This would also result in a total interleaver memory of 20 kbytes.

Alternatively, the second transceiver can determine the specific FCI configuration parameters, e.g., N, D, R as defined above, needed to meet specific application requirements, such as latency, burst error correction capability, etc. As described above for the first transceiver, in order to determine the FCI configuration parameters, the second transceiver must first know what are the capabilities of the first transceiver. In this case, the first transceiver would send a message to the second transceiver containing the information described above and based on this information and the application requirements the second transceiver would select latency path settings.

Figure 2:
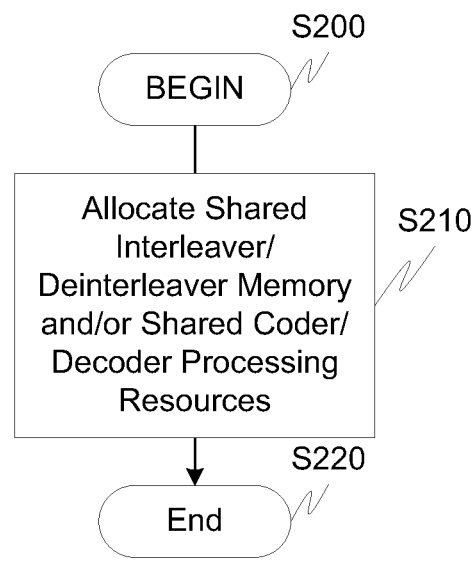
FIG. 2 is a flowchart outlining an exemplary method of sharing resources according to this invention.

FIG. 2 outlines an exemplary method of allocating shared memory in a transceiver. More specifically, control begins in step S200 and continues to step S210. In step S210, one or more of shared interleaver/deinterleaver memory and/or shared coder/decoder processing resources are allocated to one or more latency paths, in a transceiver. Control then continues to step S220 where the control sequence ends.

Figure 3:
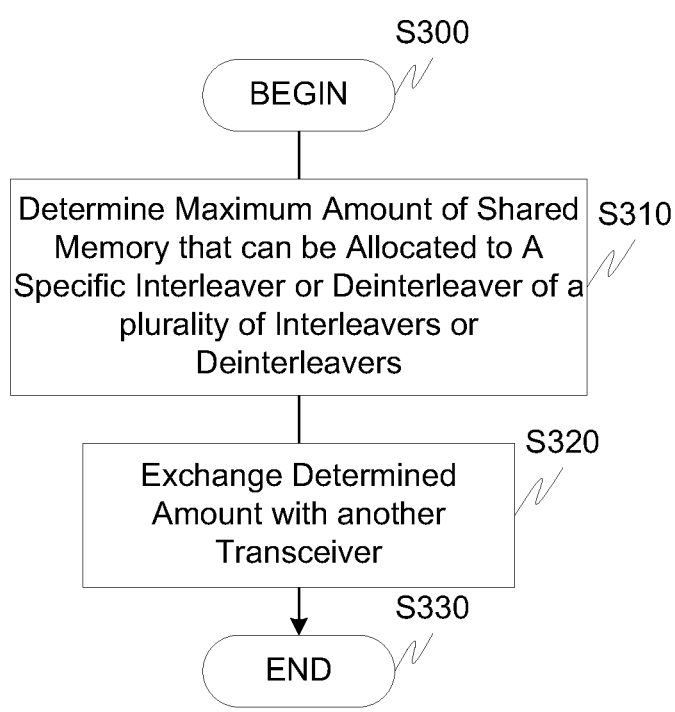
FIG. 3 is a flowchart outlining an exemplary method of determining a maximum amount of shared memory according to this invention.

FIG. 3 outlines an exemplary method of exchanging shared resource allocations according to an exemplary embodiment of this invention. In particular, control begins in step S310. In step S310, a maximum amount of shared memory that can be allocated to a specific interleaver or deinterleaver of a plurality of interleavers or deinterleavers in a transceiver is determined. Next, in step S320, the determined maximum amount for one or more of the deinterleavers and/or interleavers is transmitted to another transceiver. Messages containing additional information can also be transmitted to the other transceiver and/or received from the other transceiver. Control then continues to step S330 where the control sequence ends.

Figure 4:
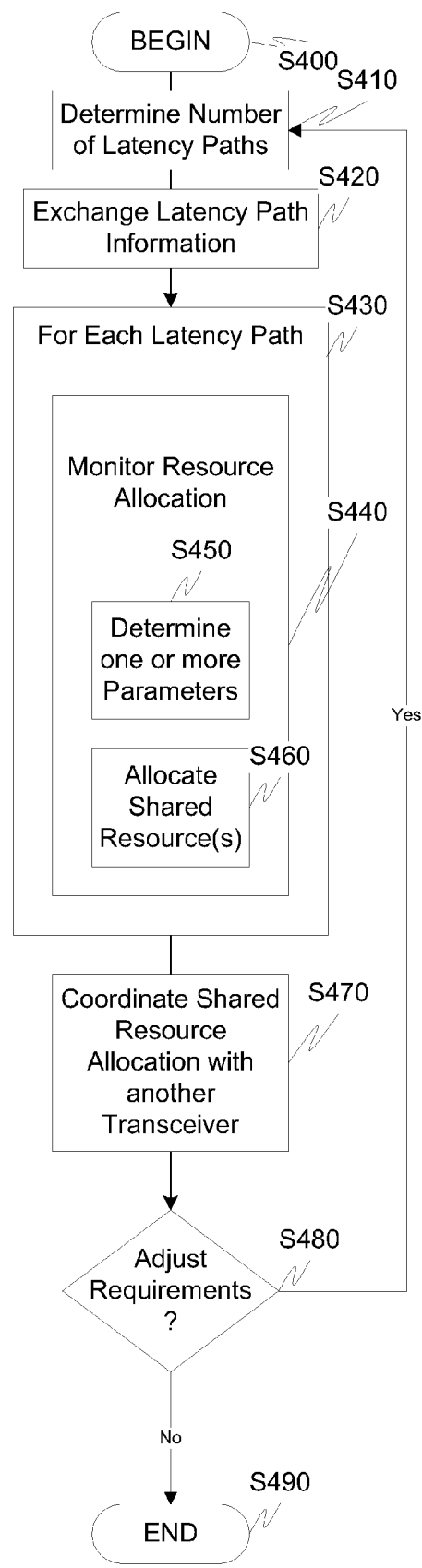
FIG. 4 is a flowchart outlining an exemplary resource sharing methodology according to this invention.

FIG. 4 outlines an exemplary procedure for resource sharing according to an exemplary embodiment of this invention. In particular, control begins in step S400 and continues to step S410. In step S410, the number of latency paths are determined. Then, in step S420, the latency path information (FCI block information) is transmitted to another transceiver. Messages containing additional information can also be transmitted to the other transceiver and/or received from the other transceiver. This information can be used to, for example, assist with the determination of memory allocation in the transceiver. Moreover, the messages received from the other transceiver could specify what the memory allocation is to be based on, for example, the number of latency paths, memory allocation in the remote transceiver and required applications. Control then continues to step S430.

In step S430, and for each latency path, the steps in step 440 are performed.

In step S440, and while monitoring of allocation of resources is being performed, steps 450 and 460 are performed. More specifically, in step S450, one or more parameters associated with the communication system are determined. Then, in step S460, shared resources are allocated based on one or more of the communication parameters. Control then continues to step S470.

In step S470, the allocation of shared resources is communicated to another transceiver. Next, in step S480, a determination is made as to whether there is a change in communications that would require the adjustment of the shared resource allocation. Examples of changes in communications conditions include a change in applications being transported over the system and/or changes in the channel condition, etc. If adjustments are required, control jumps back to step S410. Otherwise, control jumps to step S490 where the control sequence ends.

The above-described system can be implemented on wired and/or wireless telecommunications devices, such a modem, a multicarrier modem, a DSL modem, an ADSL modem, an XDSL modem, a VDSL modem, a linecard, test equipment, a multicarrier transceiver, a wired and/or wireless wide/local area network system, a satellite communication system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided, in accordance with the present invention, systems and methods for sharing resources. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:
1. A transceiver comprising:
a memory comprising a plurality of bytes, X, wherein X is a number,
wherein the memory can be shared between an interleaver function associated with a transmit latency path and a deinterleaver function associated with a receive latency path, wherein the sharing comprises using a first portion of the memory for the interleaver function and simultaneously using a second portion of the memory, different than the first portion, for the deinterleaver function, and the first and second portions are configurable such that one or more bytes of the memory can be used by the interleaver function at one particular time and the same one or more bytes of the memory can be used by the deinterleaver function at a second time, different than the first time, and
wherein the transceiver is operable to transmit a message or receive a message, wherein the message comprises information that is used to determine a maximum number of bytes, Y, of the memory, for the interleaver function and information is used to determine a maximum number of bytes, Z, of the memory, for the deinterleaver function, wherein Y and Z are positive numbers and wherein Y+Z is less than or equal to X.

2. The transceiver of claim 1, wherein the value of Y and Z vary depending on at least one impulse noise protection value.

3. The transceiver of claim 1, wherein the value of Y and Z vary depending on at least one delay value.

4. The transceiver of claim 1, wherein the value of Y and Z vary depending on at least one data rate value.

5. The transceiver of claim 1, wherein the transceiver further comprises a transmitter portion, the transmitter portion including a framer, a coder and an interleaver, wherein the framer is linked to the coder and the coder is linked to the interleaver.

6. The transceiver of claim 1, wherein the transceiver further comprises a receiver portion, the receiver portion including a deframer, a decoder and a deinterleaver, wherein the deinterleaver is linked to the decoder and the decoder is linked to the deframer.

7. The transceiver of claim 1, wherein the memory is connected to at least one coder.

8. The transceiver of claim 1, wherein the memory is connected to at least one decoder.

9. The transceiver of claim 1, further comprising a shared processing module connected to at least one coder.

10. The transceiver of claim 1, further comprising a shared processing module connected to at least one decoder.

11. A method in a multicarrier transceiver comprising a memory comprising a plurality of bytes X, wherein X is a number, the method comprising:
transmitting a message, using multicarrier modulation, or receiving a message, using multicarrier modulation, wherein the message comprises information that is used to determine a maximum number of bytes, Y, of the memory, for an interleaver function associated with a transmit latency path, and information that is used to determine a maximum number of bytes, Z, of the memory, for a deinterleaver function associated with a receive latency path, wherein Y and Z are poitive numbers and wherein Y+Z is less than or equal to X,
wherein the memory can be shared between the interleaver function and the deinterleaver function, wherein the sharing comprises using a first portion of the memory for the interleaver function and simultaneously using a second portion of the memory, different than the first portion, for the deinterleaver function, and the first and second portions are configurable such that one or more bytes of the memory can be used by the interleaver function at one particular time and the same one or more bytes can be used by the deinterleaver function at a second time, different than the first time.

12. The method of claim 11, wherein the value of Y and Z vary depending on at least one impulse noise protection value.

13. The method of claim 11, wherein the value of Y and Z vary depending on at least one delay value.

14. The method of claim 11, wherein the value of Y and Z vary depending on at least one data rate value.

15. The method of claim 11, wherein the transceiver comprises a transmitter portion, the transmitter portion including a framer, a coder and an interleaver, wherein the framer is linked to the coder and the coder is linked to the interleaver.

16. The method of claim 11, wherein the transceiver comprises a receiver portion, the receiver portion including a deframer, a decoder and a deinterleaver, wherein the deinterleaver is linked to the decoder and the decoder is linked to the deframer.

17. The method of claim 11, wherein the memory is connected to at least one coder.

18. The method of claim 11, wherein the memory is connected to at least one decoder.

19. The method of claim 11, wherein the transceiver further comprises a shared processing module connected to at least one coder.

20. The method of claim 11, wherein the transceiver further comprises a shared processing module connected to at least one decoder.

21. A transceiver comprising:
a transmitter operable to transmit a message, wherein the message comprises information that is used to determine a maximum number of bytes for an interleaver function associated with a transmit latency path and information that is used to determine a maximum number of bytes for a deinterleaver function associated with a receive latency path, and wherein the information that is used to determine the maximum number of bytes for the interleaver function and the information that is used to determine the maximum number of bytes for the deinterleaver function varies depending on at least one data rate value.

22. The transceiver of claim 21, wherein the transceiver further comprises a transmitter portion, the transmitter portion including a framer, a coder and an interleaver, wherein the framer is linked to the coder and the coder is linked to the interleaver.

23. The transceiver of claim 21, wherein the transceiver further comprises a receiver portion, the receiver portion including a deframer, a decoder and a deinterleaver, wherein the deinterleaver is linked to the decoder and the decoder is linked to the deframer.

24. The transceiver of claim 21, wherein the memory is connected to at least one coder.

25. The transceiver of claim 21, wherein the memory is connected to at least one decoder.

26. The transceiver of claim 21, further comprising a shared processing module connected to at least one coder.

27. The transceiver of claim 21, further comprising a shared processing module connected to at least one decoder.

28. A transceiver comprising:
a transmitter operable to transmit a message, wherein the message comprises information that is used to determine a maximum number of bytes for an interleaver function associated with a transmit latency path, and information that is used to determine a maximum number of bytes for a deinterleaver function associated with a receive latency path, and wherein the information that is used to determine the maximum number of bytes for the interleaver function and the information that is used to determine the maximum number of bytes for the deinterleaver function varies depending on at least one impulse noise protection value.

29. A transceiver comprising:
a transmitter operable to transmit a message, wherein the message comprises information that is used to determine a maximum number of bytes for an interleaver function associated with a transmit latency path, and information that is used to determine a maximum number of bytes for a deinterleaver function associated with a receive latency path, and wherein the information that is used to determine the maximum number of bytes for the interleaver function and the information that is used to determine the maximum number of bytes for the deinterleaver function varies depending on at least one delay value.

* * * * *